United States Patent
Hagle et al.

(10) Patent No.: US 6,905,308 B2
(45) Date of Patent: Jun. 14, 2005

(54) TURBINE NOZZLE SEGMENT AND METHOD OF REPAIRING SAME

(75) Inventors: Michael Philip Hagle, Mason, OH (US); Brian Alan Norton, Cincinnati, OH (US); James Walter Caddell, Jr., Milford, OH (US)

(73) Assignee: General Electric Company, Schenectady, NY (US)

( * ) Notice: Subject to any disclaimer, the term of this patent is extended or adjusted under 35 U.S.C. 154(b) by 45 days.

(21) Appl. No.: 10/300,098

(22) Filed: Nov. 20, 2002

(65) Prior Publication Data

US 2004/0096323 A1 May 20, 2004

(51) Int. Cl.⁷ ................................................. F03B 3/16
(52) U.S. Cl. .............................. 415/209.4; 415/210.1; 416/193 A; 416/195
(58) Field of Search .......................... 415/210.1, 209.4, 415/115, 116, 191; 416/193 A, 195

(56) References Cited

U.S. PATENT DOCUMENTS

| | | | |
|---|---|---|---|
| 3,802,046 A | 4/1974 | Wachtell et al. | |
| 4,305,697 A | 12/1981 | Cohen et al. | |
| 4,326,833 A | 4/1982 | Zelahy et al. | |
| 5,248,240 A | 9/1993 | Correia | |
| 5,269,057 A | 12/1993 | Mendham | |
| 5,272,809 A | 12/1993 | Robertson et al. | |
| 5,690,469 A | 11/1997 | Deal et al. | |
| 5,758,416 A | 6/1998 | Reverman et al. | |
| 5,797,725 A | 8/1998 | Rhodes | |
| 5,813,832 A | 9/1998 | Rasch et al. | |
| 6,154,959 A | 12/2000 | Goodwater et al. | |
| 6,173,491 B1 | 1/2001 | Goodwater et al. | |
| 6,183,192 B1 | 2/2001 | Tressler et al. | |
| 6,416,278 B1 | 7/2002 | Caddell, Jr. et al. | |

*Primary Examiner*—Edward K. Look
*Assistant Examiner*—Dwayne White
(74) *Attorney, Agent, or Firm*—Adams Evans P.A.; David L. Narciso (57) ABSTRACT

A method is provided for repairing a turbine nozzle segment having at least one vane disposed between outer and inner bands. The method includes separating the inner band from the nozzle segment, and joining the inner band to a newly manufactured replacement casting having an outer band and a vane. The replacement casting includes an airfoil stub. The airfoil stub is received in a recess formed in the inner band. Joining is completed by joining the airfoil stub to the inner band. The replacement casting may be modified from a newly manufactured singlet casting.

27 Claims, 7 Drawing Sheets

TURBINE NOZZLE SEGMENT AND METHOD OF REPAIRING SAME

BACKGROUND OF THE INVENTION

This invention relates generally to gas turbine engines and more particularly to the repair of turbine nozzle segments used in such engines.

A gas turbine engine includes a compressor that provides pressurized air to a combustor wherein the air is mixed with fuel and ignited for generating hot combustion gases. These gases flow downstream to a turbine section that extracts energy therefrom to power the compressor and provide useful work such as powering an aircraft in flight. Aircraft engines typically include stationary turbine nozzles that enhance engine performance by appropriately influencing gas flow and pressure within the turbine section. In multi-stage turbine sections, turbine nozzles are placed at the entrance of each turbine stage to channel combustion gases into the turbine rotor located downstream of the nozzle. Turbine nozzles are typically segmented around the circumference thereof with each nozzle segment having one or more vanes disposed between inner and outer bands that define the radial flowpath boundaries for the hot combustion gases flowing through the nozzle. These nozzle segments are mounted to the engine casing to form an annular array with the vanes extending radially between the rotor blades of adjacent turbine stages.

Various approaches have been proposed for manufacturing nozzle segments. In one common approach, the nozzle segment is a multi-piece assembly comprising one or more "singlet" castings each comprising a vane, a contiguous portion of an outer band, and a contiguous portion of an inner band. The singlets are then joined together at the edges of the inner and outer band portions, for example by brazing.

Nozzle segments are exposed during operation to a high temperature, corrosive gas stream that limits the effective service life of these components. Accordingly, nozzle segments are typically fabricated from high temperature cobalt or nickel-based superalloys and are often coated with corrosion and/or heat resistant materials. Furthermore, nozzle segments are ordinarily cooled internally with cooling air extracted from the compressor to prolong service life. Even with such efforts, portions of the nozzle segments, particularly the vanes, can become cracked, corroded, and otherwise damaged such that the nozzle segments must be either repaired or replaced to maintain safe, efficient engine operation. Because nozzle segments are complex in design, are made of relatively expensive materials, and are expensive to manufacture, it is generally more desirable to repair them whenever possible.

Existing repair processes include techniques such as crack repair and dimensional restoration of airfoil surfaces. However, such existing repairs are limited by local distortion and under minimum wall thicknesses, which are exceeded as a result of repeated repair and chemical stripping processes. Thus, nozzle segments may become damaged to the point where they cannot be repaired by known repair processes. The thermal and mechanical stresses in integrally cast nozzle segments are such that it often occurs that the inner band is repairable while other nozzle segment structure is non-repairable. Thus, to avoid scrapping the entire nozzle segment in such a situation, it would be desirable to have a method for salvaging the repairable portion of the nozzle segment.

BRIEF SUMMARY OF THE INVENTION

The above-mentioned need is met by the present invention, which provides a method of repairing a turbine nozzle segment having at least one vane disposed between outer and inner bands. The method includes separating the inner band from the nozzle segment, and joining the inner band to a newly manufactured replacement casting having an outer band and a vane. The replacement casting includes an airfoil stub. The airfoil stub is received in a recess formed in the inner band. Joining is completed by joining the airfoil stub to the inner band. The replacement casting may be modified from a newly manufactured singlet casting.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
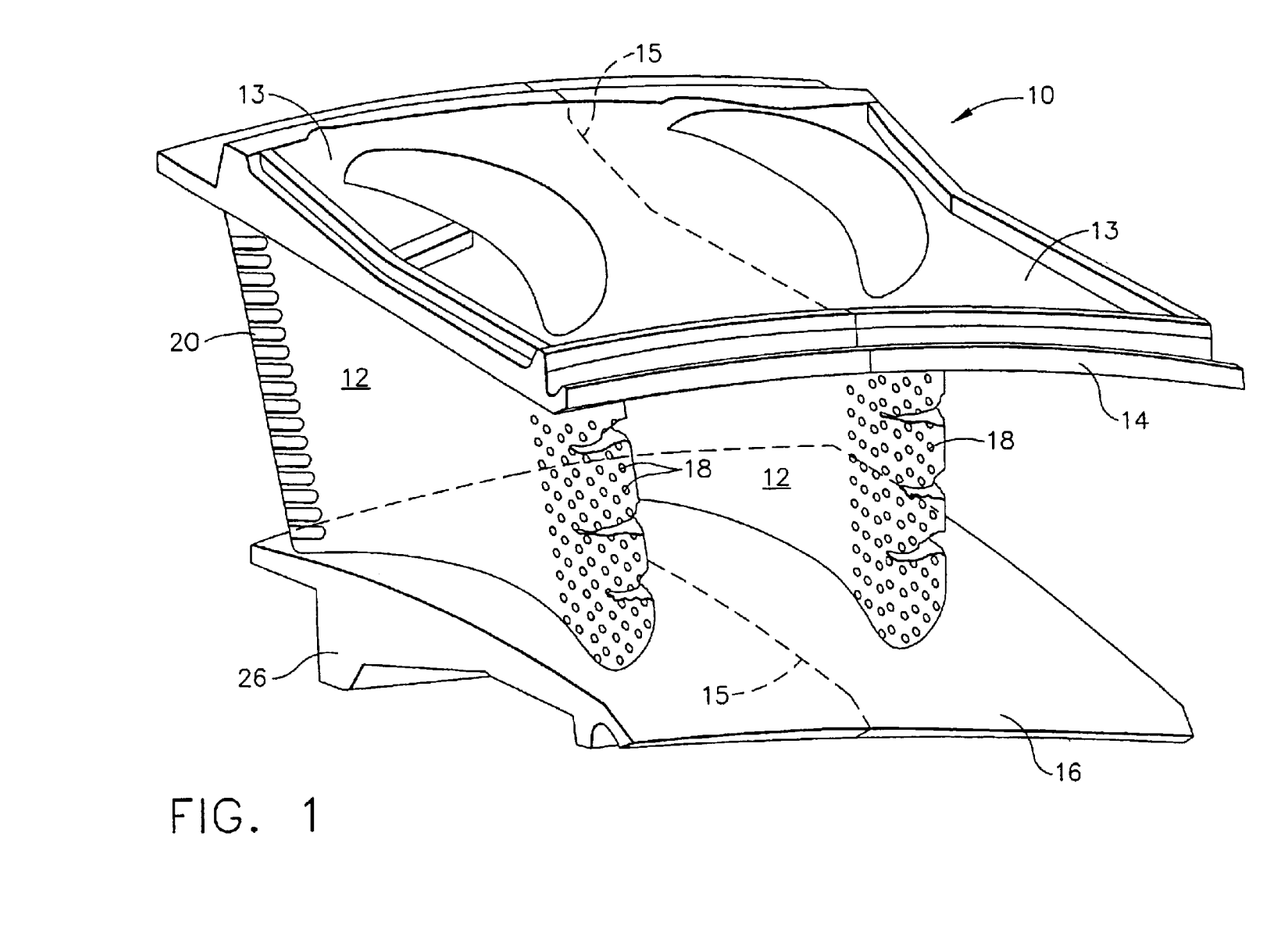
FIG. 1 is a perspective view of an engine run turbine nozzle segment.

Referring to the drawings wherein identical reference numerals denote the same elements throughout the various views, FIG. 1 shows a turbine nozzle segment 10 having first and second nozzle vanes 12. The vanes 12 are disposed between an arcuate outer band 14 and an arcuate inner band 16. The vanes 12 define airfoils configured so as to optimally direct the combustion gases to a turbine rotor (not shown) located downstream thereof. The outer and inner bands 14 and 16 define the outer and inner radial boundaries, respectively, of the gas flow through the nozzle segment 10. The vanes 12 can have a plurality of conventional cooling holes 18 and trailing edge slots 20 formed therein. Cooling holes are most typically used with first stage nozzle segments; later stage nozzle segments ordinarily do not utilize such cooling holes. The nozzle segment 10 is preferably made of a high quality superalloy, such as a cobalt or nickel-based superalloy, and may be coated with a corrosion resistant material and/or thermal barrier coating.

The nozzle segments 10 may be constructed from two or more singlets 13 which are individual castings each comprising a vane 12, a contiguous portion of an outer band 14, and a contiguous portion of an inner band 16. The individual singlets 13 are joined along joint lines 15, for example by brazing, to form the completed nozzle segment 10. A gas turbine engine will include a plurality of such segments 10 arranged circumferentially in an annular configuration. While the repair methods of the present invention are described herein with respect to a two-vane nozzle segment, it should be recognized that the present invention is equally applicable to nozzle segments having any number of vanes.

During engine operation, the nozzle segment 10 can experience damage such as might result from local gas stream over-temperature or foreign objects impacting thereon. As mentioned above, a portion of the nozzle segment 10 may become damaged to the point where it cannot be repaired by known repair processes. The present invention is directed to a method of repairing a nozzle segment in which the inner band is repairable while other nozzle segment structure is non-repairable. By way of example, the vanes 12 are shown in FIG. 1 as having extensive damage such as to be non-repairable while the inner band 16 has relatively minor damage and is repairable.

Figure 2:
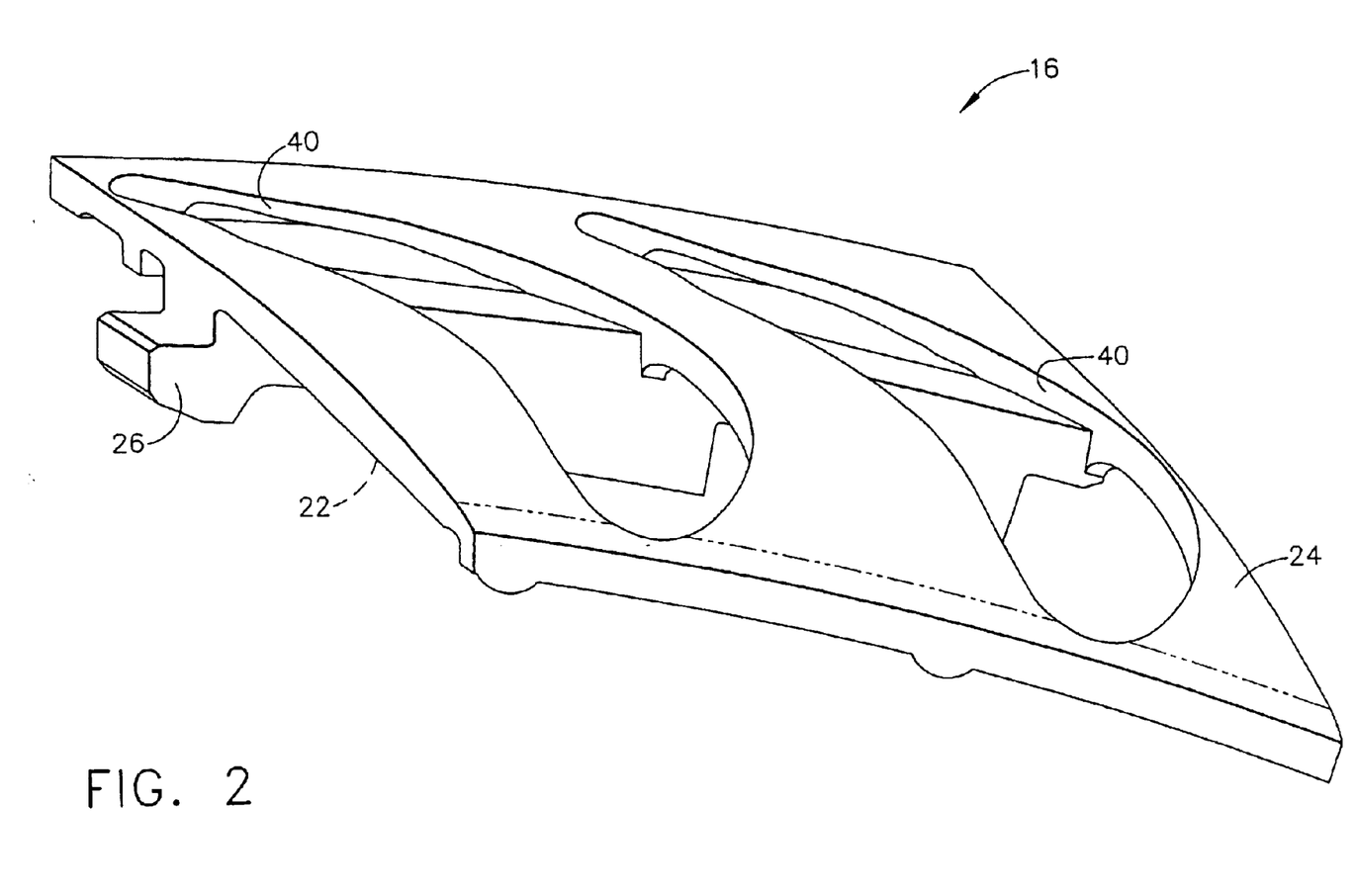
FIG. 2 is a perspective view of the inner band separated from the nozzle segment of FIG. 1.
Figure 3:
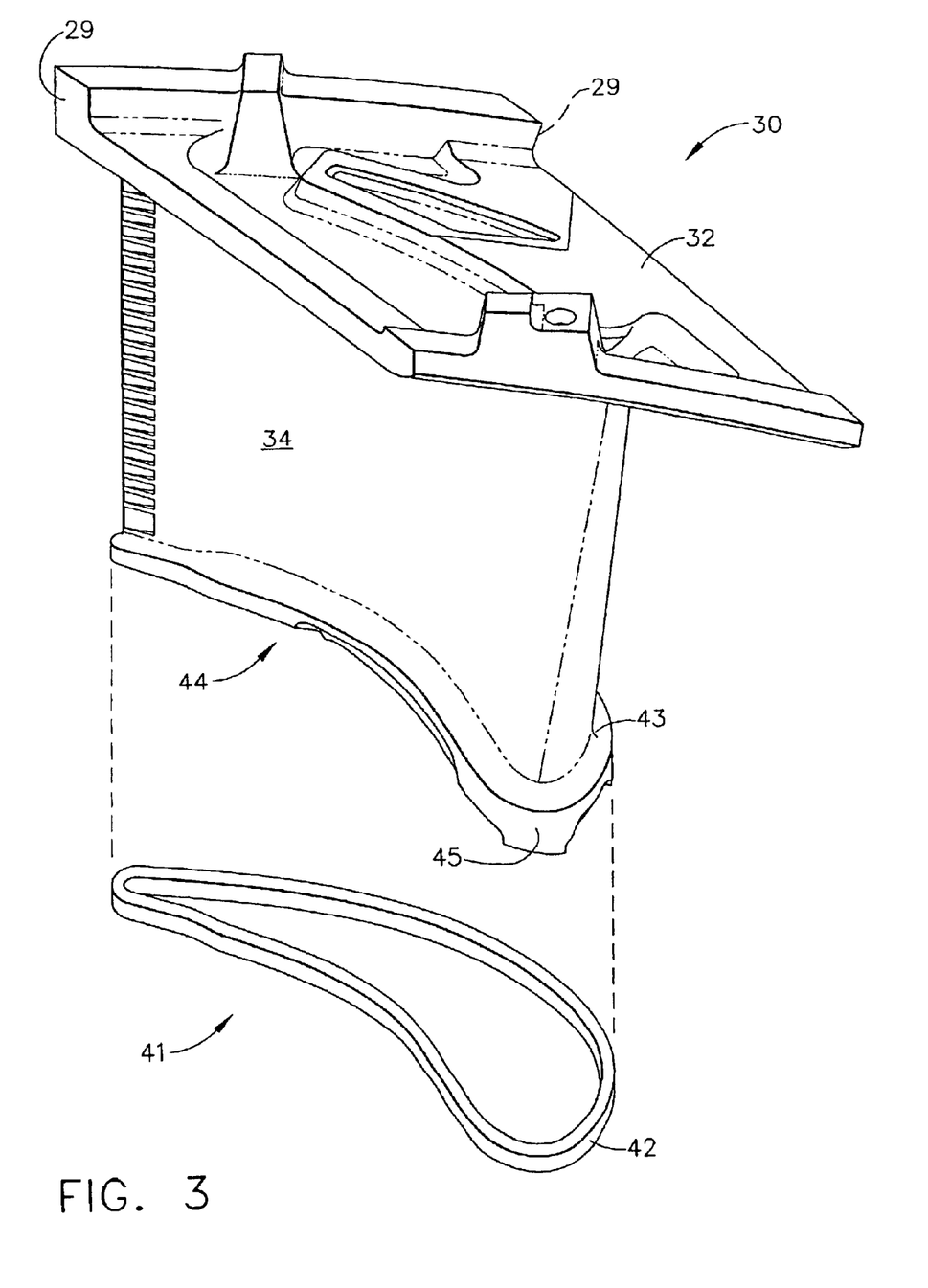
FIG. 3 is a perspective view of a replacement casting used in the repair method of the present invention.

The repair method includes the principal steps of separating the inner band 16 from the nozzle segment 10, and then joining the inner band 16 to two or more newly manufactured castings that replace the structure from which the inner band 16 was removed. As seen in FIG. 2, the salvageable inner band 16 has a cold side 22 (the side facing away from the hot gas flowpath) and a hot side 24 (the side facing the hot gas flowpath), and includes conventional structure such as flanges 26. The flanges 26 provide structural support to the inner band 16 and also provide a sealing function when the nozzle segment 10 is installed in an engine. FIG. 3 shows one of the newly manufactured castings, which are hereinafter referred to as the replacement castings 30. Each of the replacement castings 30, which are described in more detail below, is an integrally cast piece having an outer band portion 32, a vane 34, and an airfoil stub 44.

More specifically, the initial step of the repair method is to inspect engine run nozzle segments returned from the field for servicing to identify such segments 10 that have a repairable inner band 16, while other nozzle segment structure is non-repairable. Once a suitable nozzle segment 10 has been identified, it should be stripped of any coating materials (such as corrosion or thermal resistant coatings) that may be present. The coating material may be stripped using any suitable technique, such as grit blasting, chemical baths, and the like, or by a combination of such techniques. The next step is to repair cracks in the inner band 16 and perform dimensional build-up of the flanges 26, using known repair techniques such as alloy brazing, alloy build up, welding and the like. These conventional repairs will be carried out as needed depending on the condition of the inner band 16. Any corrosion or thermal coatings that were originally used are not reapplied at this time.

The next step is to separate the inner band 16 from the rest of the nozzle segment 10. Separation is accomplished by rough cutting through both vanes 12 near the inner band 16. The cutting can be performed by any conventional means such as an abrasive cutting wheel or electrical discharge machining. After separation, the unsalvageable structure is scrapped, and the inner band 16 is prepared for joining to the replacement casting 30.

Next, the inner band 16 is prepared for joining to the replacement castings 30. As shown in FIG. 2, two recesses 40 are formed in the hot side 24 of the inner band 16. The perimeter of the recesses 40 approximates the airfoil contour of the vanes 34. One preferred manner of forming the airfoil shaped recesses 40 is to plunge electrical discharge machine (EDM) each recess 40. This is accomplished using an EDM electrode having the airfoil shape. The electrode is plunged only to a depth that removes the flow path wall and does not plunge into the support flanges 26. However, the recesses 40 will break through a significant portion of the inner band 16 at several locations as shown.

FIG. 3 shows an exemplary replacement casting 30. Each of the replacement castings 30 is an integrally cast piece having an outer band portion 32 and a vane 34. The outer band portion 32 includes opposed lateral edges 29 which mate with corresponding lateral edges of an adjacent replacement casting 30 during the assembly process described below. The outer band portion 32 and the vane 34 may be the same as those on a complete nozzle segment 10, including the same internal cooling passages. The vane 34 includes an airfoil stub 44 formed on the radially inner end thereof. The airfoil stub 44 surrounds the perimeter of the vane 34. The airfoil stub 44 extends laterally beyond the surface of the vane and includes a joint surface 45. A fillet 43 is disposed between the vane 34 and the airfoil stub 44. This configuration locates the braze joint away from the fillet 43. This allows the formation of a more satisfactory braze joint than if the joint were located in the fillet 43, and also allows the incorporation of cooling features within the fillet 43 if desired. For example, film cooling holes of a known type (not shown) may be formed through the fillet 43.

Prior art repair methods often require the use of specially made replacement castings. While the present invention may be used with specially made replacement castings, it also allows the use of standard production component castings as replacement castings 30. FIG. 5 shows an exemplary newly manufactured singlet casting 13 which may be used to make a replacement casting 30. As discussed above, the newly manufactured casting 13 typically is a singlet which includes a vane 34, a contiguous portion of an outer band 32, and a contiguous portion of an inner band 35. The singlet 13 is prepared for use as a replacement casting 30 by cutting through the inner band 35 along a cutline 17, for example by wire EDM machining. The inner band 35 is then separated and discarded, and the remaining structure forms the replacement casting 30 shown in FIGS. 3 and 4. The position of the cut line 17 is selected so that the airfoil stub 44 described above will be remain on the radially inner end of the vane 34 after the inner band 35 is removed.

The thicknesses of the inner band 16 and the airfoil stubs 44 of the vanes 34 must be large enough to provide the desired lap joint surface area to result in a braze joint of adequate strength. In some cases, the joining surfaces of the replacement castings 30 and the inner band 16 will already be of sufficient area. However, if needed, one or more collars, described below, may be attached to the cold side 22 of the inner band 16, or to the airfoil stubs 44 of the vanes 34, to increase the lap joint surface area.

Figure 6:
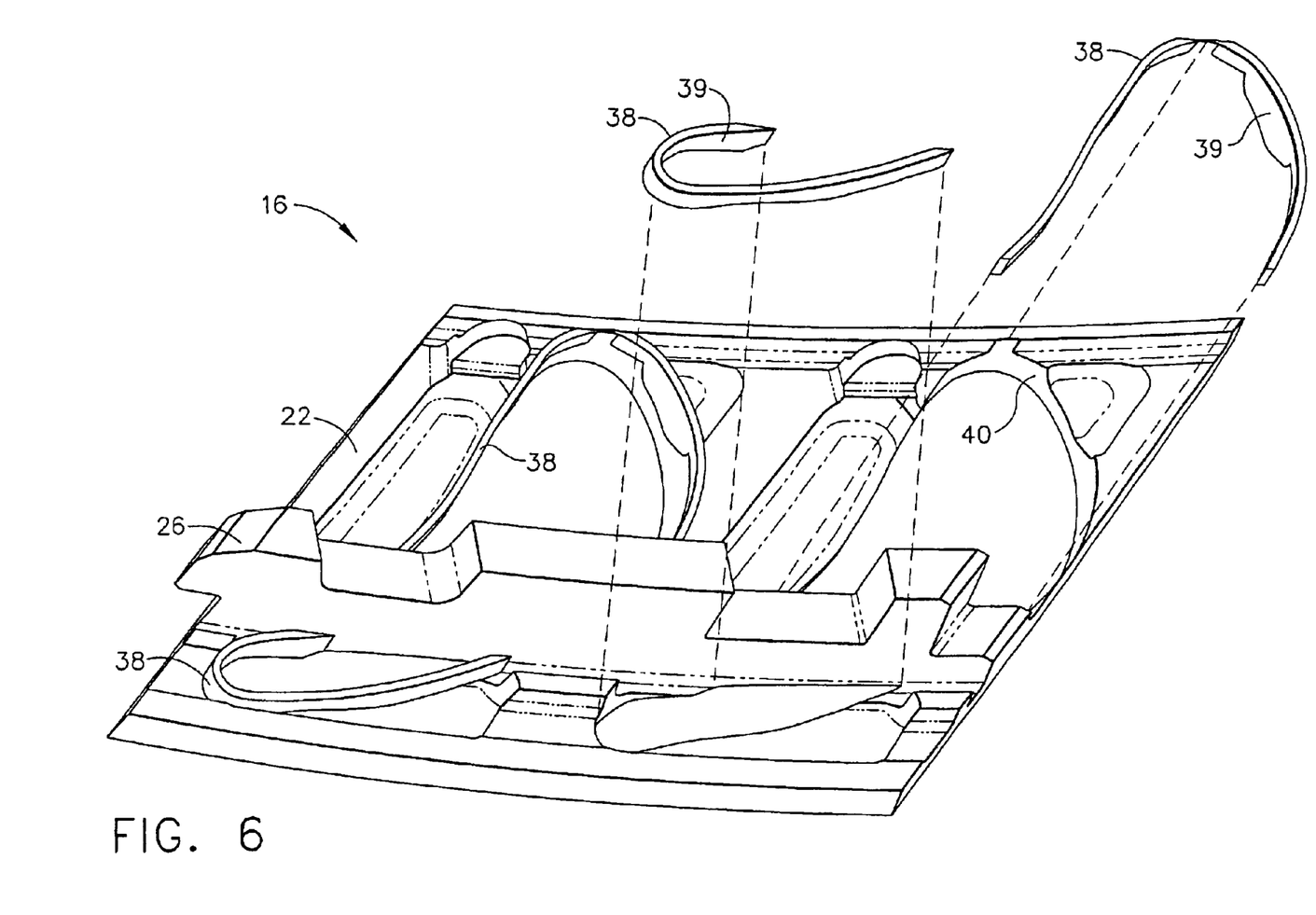
FIG. 6 is a perspective view of the inner band of FIG. 2 showing the radially inner or "cold" side thereof.

Exemplary inner band collars 38 are shown in FIG. 6. Each inner band collar 38 is shaped to match the curve of the inner band 16 and has a surface that interfaces with the cold side 22 of the inner band 16. The inner band collars 38 may be arranged to follow the perimeter of the recesses 40 and to fit around the flange 26. For example, FIG. 6 illustrates 4 airfoil-shaped collars, one forward of the flange 26 and one aft of the flange 26 for each recess 40. Other collar arrangements may be used to suit a particular application. If needed, a flat pocket (not shown) may be machined into the inner band cold side 22 to facilitate seating of the collar 38 on the contoured cold side 22 of the inner band 16. The inner band collars 38 are preferably made of the same or similar material as the inner band 16 or at least of a material that is compatible for joining to the inner band 16 and the replacement casting 30. Each inner band collar 38 also has a joining surface 39 along its inner perimeter which provides the additional braze joint area. The thickness measured in the radial direction of the collar 38 is selected to provide an adequate surface area for brazing the replacement casting 30 to the inner band 16. The inner band collars 38 may be attached to the inner band 16 by tack welding.

Figure 4:
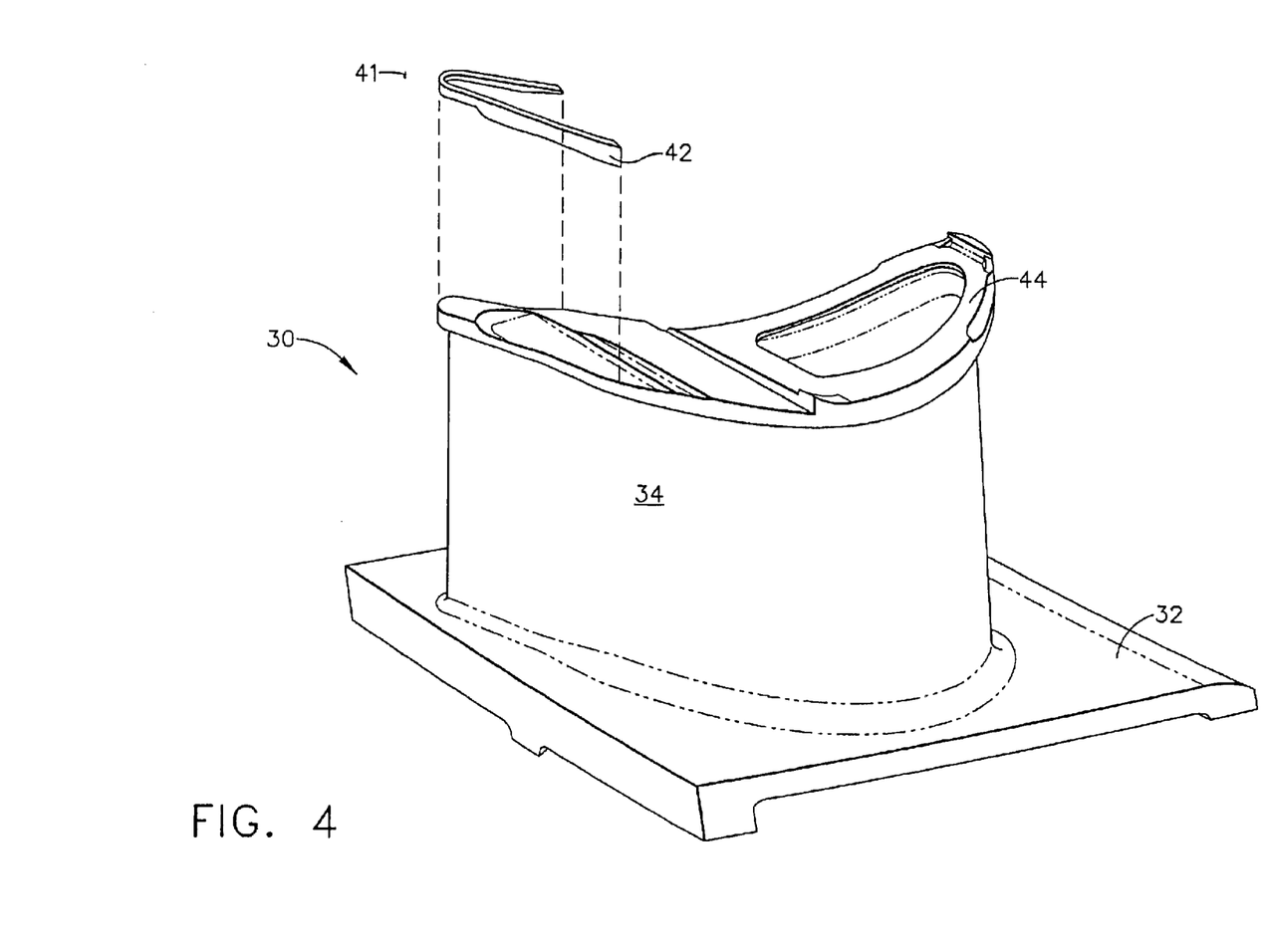
FIG. 4 is another perspective view of the replacement casting of FIG. 3.
Figure 5:
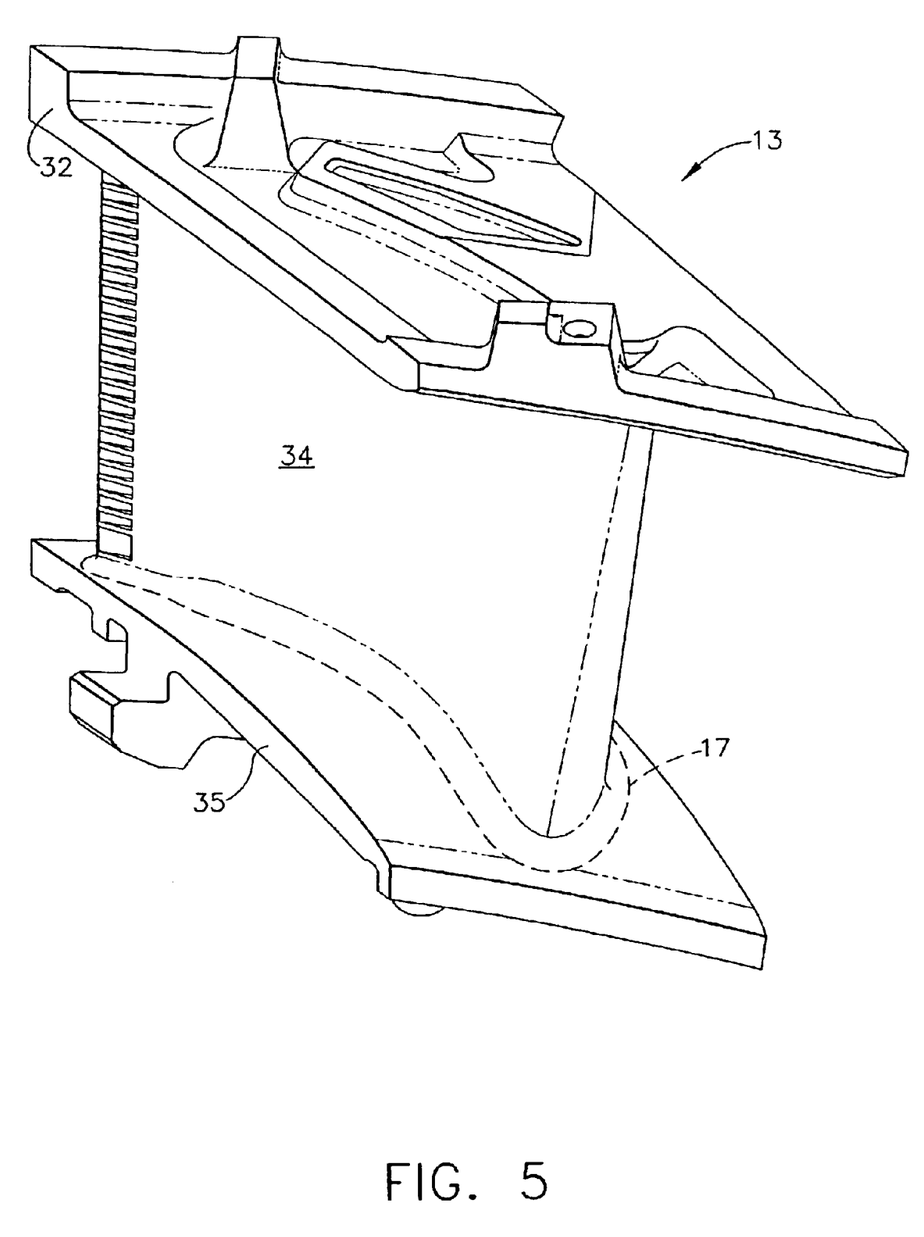
FIG. 5 is a perspective view of a exemplary production casting used to make the replacement casting of FIG. 3.

Exemplary vane collars 41 are shown in more detail in FIGS. 3 and 4. The vane collars 41, if used, could be a single collar extending all the way around the periphery of the airfoil stub 44 (see FIG. 3), or a partial collar (see FIG. 4), depending on the amount of additional joint area required for a satisfactory braze joint. In either case the vane collar 41 has an inner surface that conforms to the radially inner surface of the airfoil stub 44 and the required thickness (radial height) to provide the desired lap joint area. Each vane collar 41 also includes a joining surface 42 along its outer perimeter which provides the additional braze joint area. As with the inner band collars 38, the vane collars 41 are preferably made of the same or similar material as the inner band 16 or at least of a material that is compatible for joining to the inner band 16 and the replacement casting 30. The vane collars 41 may be attached to the airfoil stubs 44 by tack welding.

Figure 7:
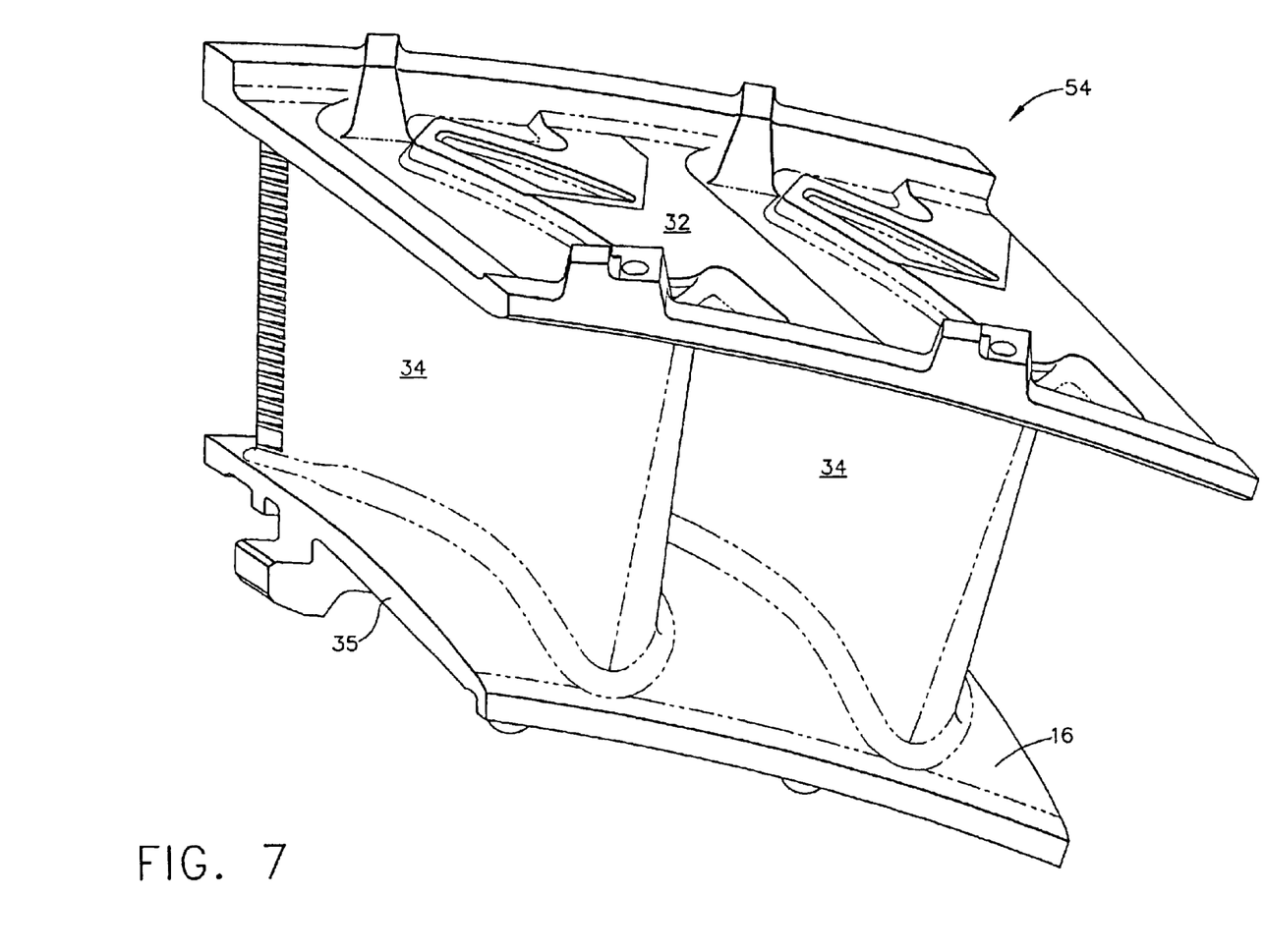
FIG. 7 is a perspective view of a repaired turbine nozzle segment.

After inner band machining is completed and the collars 38 and 41 are attached (if used), the inner band 16 and the replacement castings 30 are assembled to form a repaired nozzle segment 54 shown in FIG. 7. The inner band 16 and the replacement castings 30 are assembled by installing the airfoil stubs 44 into the corresponding recesses 40, as shown in FIG. 7. The parts are then joined together by bonding along the following interfaces: the airfoil stub-to-inner band interfaces on the inner band hot side 24, the vane collar-to-vane interfaces (if vane collars 41 are used), the inner band collar-to-inner band interfaces on the inner band cold side 22 (if collars are used on the inner band), and the mating edges 29 of the outer band portions 32. If collars are used, then the joining surfaces 42 of vane collars 41 are also bonded to the joining surfaces 39 of the inner band collars 38. Bonding may be accomplished in a conventional manner such as brazing or welding although brazing is generally preferred given the thermal gradients that the part will be exposed to during engine operation. One preferred joining operation would be to first tack weld each vane stub 44 to the respective recess 40, and then to tack weld the outer bands 32 together at their mating edges. The next step would be to pack the inner band hot side 24 with braze powder and apply slurry over the airfoil stub-to-inner band interfaces. On the cold side 22, braze alloy is applied to collar-band or inner band-vane interfaces. If vane collars 41 are used, braze alloy would be applied to the vane collar-to-airfoil stub interfaces before inserting the airfoil stubs 44 into the recess 40. The assembly is then placed in a furnace, positioned with the inner band 16 up, and brazed using a known braze cycle.

Lastly, any corrosion or thermal coatings that were originally used are reapplied in a known manner. The result is a repaired nozzle segment 54 having a previously used section (corresponding to the inner band 16) and a newly manufactured section (corresponding to the replacement castings 30).

In one embodiment, the replacement castings 30 are fabricated from the same material as the inner band 16 to produce a repaired nozzle segment 54 that retains the material properties of the original nozzle segment 10. However, in another embodiment, the replacement castings 30 are fabricated from a different material, preferably an alloy having enhanced material properties. It is often the case that during the service life of a gas turbine engine component such as a nozzle segment, improved alloys suitable for use with such components are developed. Traditionally, engine operators would have to replace existing components with new components fabricated from the improved alloy to realize the enhanced material properties. However, by fabricating the replacement castings 30 from the improved alloy, the repaired nozzle segment 54 will obtain, in part, the enhanced material properties.

The replacement castings 30 may also have modified design features compared to the original nozzle segment 10. As with the alloys described above, it is often the case that during the service life of a gas turbine engine component such as a nozzle segment, improved component designs are developed. The nozzle segment 10 may comprise a first design having particular aerodynamic, thermodynamic, and mechanical aspects. For example, the vanes 12 may be formed according to a first airfoil definition which incorporates a first trailing edge cooling arrangement (i.e. the configuration of slots, holes, and internal passages which direct pressurized cooling air to the trailing edge of the vane 12). The replacement castings 30 may comprise a modified design. The modified design may include a second trailing edge cooling design of a known type, which has a different arrangement of slots, holes, and internal casting features that the first trailing edge cooling arrangement, and which is intended to provide improved cooling performance relative to the first trailing edge cooling arrangement. The aerodynamic design of the vane 34 may also be modified to improve its performance. This embodiment of the present invention produces a repaired nozzle segment 54 that obtains the benefit of improved component design features without having to replace the entire nozzle segment. This aspect of the present invention may also be combined with the improved alloys described above. That is, the original nozzle segment 10 may incorporate a first alloy and a first design, while the replacement castings 30 may incorporate modified design features and may be constructed of an alloy having enhanced material properties.

The foregoing has described a fabricated repair method for turbine nozzle segments used in the repair process. While specific embodiments of the present invention have been described, it will be apparent to those skilled in the art that various modifications thereto can be made without departing from the spirit and scope of the invention as defined in the appended claims.

What is claimed is:

1. A method of repairing a turbine nozzle a segment having at least two vanes disposed between outer and inner bands, said method comprising:
    separating said inner band from said nozzle segment;
    repairing damage in said inner band;
    joining said inner band to at least two newly manufactured replacement castings, each of said replacement castings having an outer band portion and a vane having an airfoil stub formed thereon, said outer band portions cooperating to define a replacement for said outer band; and
    bonding said outer band portions to each other.

2. The method of claim 1 further comprising joining a vane collar to said airfoil stub.

3. The method of claim 2 further comprising joining an inner band collar to said inner band.

4. The method of claim 3 further comprising joining said inner band collar to said vane collar.

5. The method of claim 1 further comprising joining an inner band collar to said inner band.

6. The method of claim 1 wherein said replacement casting is fabricated from the same material as said inner band.

7. The method of claim 1 wherein said replacement casting is fabricated from a material that has enhanced material properties with respect to the material that said inner band is fabricated from.

8. The method of claim 1 wherein said vanes of said nozzle segment have a first design and said vanes of said replacement castings have a modified design.

9. The method of claim 8 wherein said vanes of said nozzle segment have a first trailing edge cooling configuration and said vanes of said replacement castings have a modified trailing edge cooling configuration.

10. A method of repairing a turbine nozzle segment having at least two vanes disposed between outer and inner bands, said method comprising:

separating said inner band from said nozzle segment;

providing a newly manufactured replacement casting for each vane of said turbine nozzle segment, said replacement casting having an outer band portion and a vane, said vane of said replacement casting having an airfoil stub formed on one end thereof;

forming one recess for each vane of said replacement casting in a first side of said inner band;

for each of said replacement castings, inserting said airfoil stub into said corresponding recess; joining each of said airfoil stubs to said inner band; and joining adjacent ones of said outer band portions to each other.

11. The method of claim 10 further comprising joining a vane collar to said airfoil stub.

12. The method of claim 11 further comprising joining an inner band collar to a second side of said inner band.

13. The method of claim 12 further comprising joining said inner band collar to said vane collar.

14. The method of claim 10 further comprising joining an inner band collar to a second side of said inner band.

15. The method of claim 10 wherein providing said replacement casting comprises providing a newly manufactured singlet casting including a vane, a contiguous portion of an outer band, and a contiguous portion of an inner band, and removing said contiguous portion of said inner band from said newly manufactured singlet casting while leaving said airfoil stub.

16. The method of claim 12 further comprising forming one pocket in said inner band for each of said inner band collars, each of said inner band collars being joined to said inner band at said corresponding pocket.

17. The method of claim 10 further comprising the step of repairing damage in said inner band.

18. The method of claim 10 wherein said replacement casting is fabricated from the same material as said inner band.

19. The method of claim 10 wherein said replacement casting is fabricated from a material that has enhanced material properties with respect to the material that said inner band is fabricated from.

20. The method of claim 10 wherein said vanes of said nozzle segment have a first design and said vanes of said replacement castings have a modified design.

21. The method of claim 20 wherein said vanes of said nozzle segment have a first trailing edge cooling configuration and said vanes of said replacement castings have a modified trailing edge cooling configuration.

22. A turbine nozzle segment comprising:

an inner band; and at least two replacement castings each including an outer band portion and a vane disposed between said outer and inner bands, wherein said inner band is previously used and repaired structure and said replacement castings are newly manufactured structure, said outer band portions being bonded together to cooperatively define an outer band of said nozzle segment.

23. The nozzle segment of claim 22 wherein said inner band and said replacement casting are fabricated from the same material.

24. The nozzle segment of claim 22 wherein said replacement casting is fabricated from a material that has enhanced material properties with respect to the material that said inner band is fabricated from.

25. The turbine nozzle segment of claim 22 wherein said vanes of said nozzle segment have a first design and said vanes of said replacement castings have a modified design.

26. The turbine nozzle segment of claim 25 wherein said vanes of said nozzle segment have a first trailing edge cooling configuration and said vanes of said replacement castings have a modified trailing edge cooling configuration.

27. A method of repairing a turbine nozzle segment having at least one vane disposed between outer and inner bands, said method comprising:

separating said inner band from said nozzle segment;

providing a newly manufactured singlet casting for each vane of said turbine nozzle segment, said singlet casting having a vane, a contiguous portion of an outer band, and a contiguous portion of an inner band;

removing said contiguous portion of said inner band from said newly manufactured singlet casting while leaving an airfoil stub formed on one end of said vane;

forming one recess for said vane of said singlet castings in a first side of said inner band;

for each of said singlet castings, inserting said airfoil stub into said corresponding recess; joining each of said airfoil stubs to said inner band;

and joining adjacent ones of said outer band portions to each other.

* * * * *

UNITED STATES PATENT AND TRADEMARK OFFICE
CERTIFICATE OF CORRECTION

PATENT NO.    : 6,905,308 B2                                                    Page 1 of 1
DATED         : June 14, 2005
INVENTOR(S)   : Hagle, Michael Philip, Norton, Brian Alan and Caddell, Jr., James Walter It is certified that error appears in the above-identified patent and that said Letters Patent is hereby corrected as shown below:

<u>Column 6,</u>
Line 44, delete the "a" (third occurrence).

Signed and Sealed this

Ninth Day of August, 2005

JON W. DUDAS
*Director of the United States Patent and Trademark Office*